(12) United States Patent
Daniel et al.

(10) Patent No.: US 10,328,813 B2
(45) Date of Patent: Jun. 25, 2019

(54) EXTENDABLE ELECTRIC COUPLING DEVICE FOR AN ELECTRIC VEHICLE CHARGING STATION

(71) Applicant: BLUETRAM, Puteaux (FR)

(72) Inventors: Ronan Daniel, Ploneis (FR); Jean Marc Gouzerh, Quimper (FR); Christian Louvel, Edern (FR)

(73) Assignee: BLUETRAM, Puteaux (FR)

( * ) Notice: Subject to any disclaimer, the term of this patent is extended or adjusted under 35 U.S.C. 154(b) by 61 days.

(21) Appl. No.: 15/512,832

(22) PCT Filed: Sep. 25, 2015

(86) PCT No.: PCT/EP2015/072160
§ 371 (c)(1),
(2) Date: Mar. 20, 2017

(87) PCT Pub. No.: WO2016/046392
PCT Pub. Date: Mar. 31, 2016

(65) Prior Publication Data
US 2017/0291497 A1    Oct. 12, 2017

(30) Foreign Application Priority Data
Sep. 25, 2014  (FR) ...................................... 14 59052

(51) Int. Cl.
*H02J 7/00*      (2006.01)
*H02J 7/14*      (2006.01)
(Continued)

(52) U.S. Cl.
CPC ....... *B60L 11/1827* (2013.01); *B60L 11/1818* (2013.01); *B60L 53/16* (2019.02);
(Continued)

(58) Field of Classification Search
USPC ........ 320/109, 107, 108, 112, 114, 134, 136
See application file for complete search history.

(56) References Cited

U.S. PATENT DOCUMENTS

| | | | |
|---|---|---|---|
| 5,306,999 A | | 4/1994 | Hoffman |
| 5,617,003 A | * | 4/1997 | Odachi ................. B60L 11/182 |
| | | | 320/108 |

(Continued)

FOREIGN PATENT DOCUMENTS

| | | |
|---|---|---|
| JP | H01248902 | 10/1989 |
| JP | 2000092620 A | 3/2000 |

(Continued)

OTHER PUBLICATIONS

International Search Report with English Translation dated Feb. 17, 2016, Application No. PCT/EP2015/072160.
(Continued)

*Primary Examiner* — Alexis B Pacheco
(74) *Attorney, Agent, or Firm* — Womble Bond Dickinson (US) LLP (57) ABSTRACT

The present invention concerns an electric coupling device for an electric vehicle charging station comprising a ram/coupler (310) provided with an extendable arm (320) suitable for being moved between a retracted position and an extended position in which the arm (320) is adapted to provide an electric link and support means (200, 100) for supporting the ram/coupler (310) allowing two degrees of rotational freedom of the ram relative to a support base, about two axes (202, 302) generally transverse to each other and generally orthogonal to the direction of extension (322) of the arm (320), the ram/coupler (310) being placed in a protective housing capable of angular displacement about a vertical axis and about a horizontal axis (302) perpendicular to the direction of extension (322) of the arm (320) relative to a support base, the extendable arm (320) being mounted (Continued)

on a means linked to a strand of a belt driven by a geared motor (340), a counterweight (350) being linked to an opposing strand of the belt.

7 Claims, 12 Drawing Sheets

(51) Int. Cl.
  *B60L 11/18* (2006.01)
  *B60L 53/16* (2019.01)
  *B60L 53/30* (2019.01)
  *B60L 53/35* (2019.01)
(52) U.S. Cl.
  CPC ............... *B60L 53/30* (2019.02); *B60L 53/32* (2019.02); *B60L 53/35* (2019.02); *H02J 7/0027* (2013.01); *H02J 7/0045* (2013.01); *Y02T 10/7005* (2013.01); *Y02T 10/7072* (2013.01); *Y02T 90/121* (2013.01); *Y02T 90/125* (2013.01); *Y02T 90/128* (2013.01); *Y02T 90/14* (2013.01)

(56) References Cited

U.S. PATENT DOCUMENTS

| | | | | |
|---|---|---|---|---|
| 6,157,162 | A * | 12/2000 | Hayashi | B60L 11/1818 320/104 |
| 2011/0295420 | A1* | 12/2011 | Wagner | G05D 1/0225 700/245 |
| 2011/0298422 | A1* | 12/2011 | Failing | B60L 3/00 320/109 |
| 2011/0316474 | A1 | 12/2011 | Kimura et al. | |
| 2012/0048983 | A1* | 3/2012 | Bianco | B60L 11/1818 242/388.9 |
| 2012/0280656 | A1* | 11/2012 | Bedell | B60L 3/0069 320/109 |
| 2012/0286730 | A1* | 11/2012 | Bonny | B60L 11/1827 320/109 |
| 2013/0193918 | A1* | 8/2013 | Sarkar | B60L 3/04 320/109 |
| 2013/0221918 | A1* | 8/2013 | Hill | H02J 7/34 320/109 |
| 2014/0067660 | A1* | 3/2014 | Cornish | G06Q 20/145 705/39 |
| 2014/0070767 | A1* | 3/2014 | Morris | B60L 5/42 320/109 |
| 2014/0340027 | A1* | 11/2014 | Keeling | B60L 11/1829 320/108 |

FOREIGN PATENT DOCUMENTS

| | | |
|---|---|---|
| JP | 2000139030 | 5/2000 |
| JP | 2004214125 A | 7/2004 |
| JP | 2013515645 | 5/2013 |

OTHER PUBLICATIONS

French Search Report with English Language Translation Cover Sheet dated Aug. 12, 2015, FR Application No. 1459052.

\* cited by examiner

EXTENDABLE ELECTRIC COUPLING DEVICE FOR AN ELECTRIC VEHICLE CHARGING STATION

The invention relates to the domain of electric vehicle charging stations.

This invention is particularly but not exclusively applicable to tramway type vehicles.

Even more precisely, this invention relates primarily to an extendable electric coupling device composed of a ram/coupler that will be associated with an electric vehicle charging station to charge an associated electric vehicle.

Different devices for making contact with an electric vehicle to change the vehicle at a charging station are known in the state of the art.

For example, document EP 1 938 438 describes an electric vehicle charging station comprising an arm formed on the roof of a bus/tramway that will be connected to a connected installed in a station.

However devices of the type described in the document mentioned above are not fully satisfactory. In practice, it is observed that the force created during extension of the arm described in this document generates high stresses and high risks of breakage. Since the actuation energy of the ram described in the above-mentioned document is pneumatic, it induces velocities and forces that are not easy to manage, a permanently maintained pressure that can be dangerous, particularly for example if someone puts their hand between an extending arm and the receiving cone facing the arm.

Furthermore, the above-mentioned devices involve inaesthetic protuberances on the roof of the bus, and a very large volume and heavy system that has to be taken into account for road holding of the bus.

Documents US 2011/316474 and U.S. Pat. No. 6,157,162 are also known in the state of the art, each of which describes an electric coupling device for charging an electric vehicle.

The purpose of the invention is to disclose means of improving the state of the art.

This purpose is achieved by this invention due to an electric coupling device for an electric vehicle charging station comprising a ram/coupler comprising an extendable arm suitable for being moved between a retracted position and an extended position in which the arm is adapted to provide an electric link, and support means for supporting the ram/coupler allowing two degrees of rotational freedom of the ram relative to a support base, about two axes generally transverse to each other and generally orthogonal to a direction of extension of the arm, the ram/coupler being placed in a protective housing capable of angular displacement about a vertical axis and about a horizontal axis perpendicular to the direction of extension of the arm relative to a support base.

An expert in the subject will understand that the invention thus discloses a ram system associated with the charging station and that will cooperate with the vehicle that arrives in front of a charging station.

The ram has several degrees of freedom to optimise the connection between the station and the vehicle. The ram also comprises a reliable and safe movement control system to optimise operation and prevent any dysfunction problems.

According to other advantageous characteristics of the invention:
- the extendable arm is at least partly flexible (or at least includes a flexible part),
- the ram/coupler is placed in a box or casing comprising a door pulled into the closed position when the ram/coupler is in the retracted position, and automatically opens when an arm extension command is given,
- the device comprises a counterweight that is moved automatically in the direction opposite to the direction of extension of the extendable arm, so as to keep the centre of gravity of the assembly approximately at the intersection point of the two pivot axes of the support means,
- the device comprises means forming a stop limiting angular movements around the pivot axes and damping means slowing displacements around the pivot axes.

This invention also relates to charging stations in which an electric coupling device like that described above complying with the invention is installed.

Other technical characteristics, purposes and advantages of this invention will become clear after reading the detailed description given below, with reference to the appended drawings given as non-limitative examples, and on which:

FIG. 11 represents a similar view of the door as it is being opened, FIG. 12 more precisely represents cooperation between an actuation finger provided on a counterweight and a cam fixed to the door, FIG. 13 diagrammatically represents cooperation between an electrical charging station and a tramway, FIG. 14 diagrammatically represents engagement of an extendable arm of the electric coupling device conforming with the invention provided on an electric charging station with an additional cone provided on a tramway.

The coupling device according to this invention comprises:
- a base 100 that will be fixed onto the support frame of a charging station,
- an intermediate element 200 free to move in the angular direction around a vertical axis 202 on the base 100, and
- a housing or case 300 that houses a ram 310, the arm 320 of which can be extended in a horizontal direction 322, preferably orthogonal to the direction of displacement of the vehicle to be connected with regard to the station.

The case 300 itself can be moved in an angular movement about a horizontal axis 302 orthogonal to the direction of extension 322.

There can be many variant embodiments of the base plate 100 and they will not be described in detail in the following.

The intermediate element 200 is in the general shape of a clevis or a U-piece, comprising a horizontal base 210 and two wings or vertical side walls 212, 214.

Figure 6:
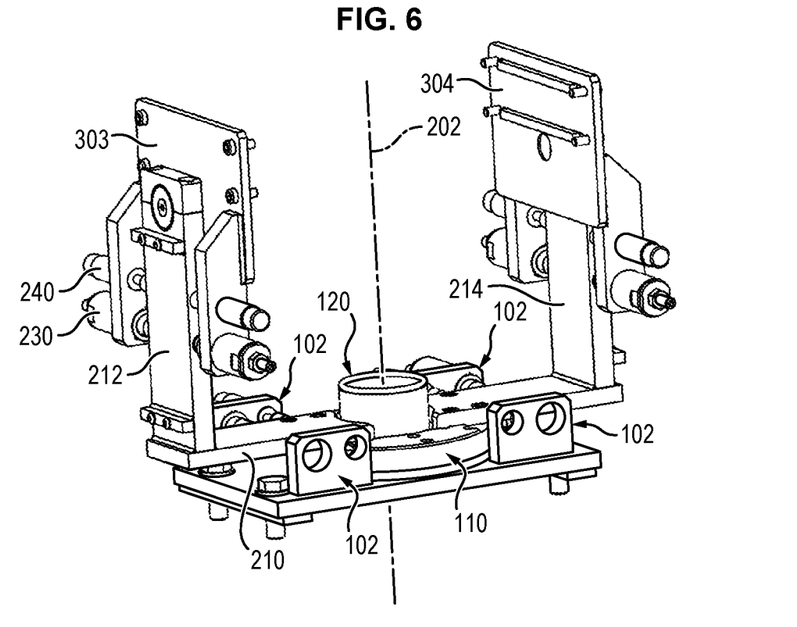
FIG. 6 represents a view of the intermediate device hinged onto the base.
Figure 7:
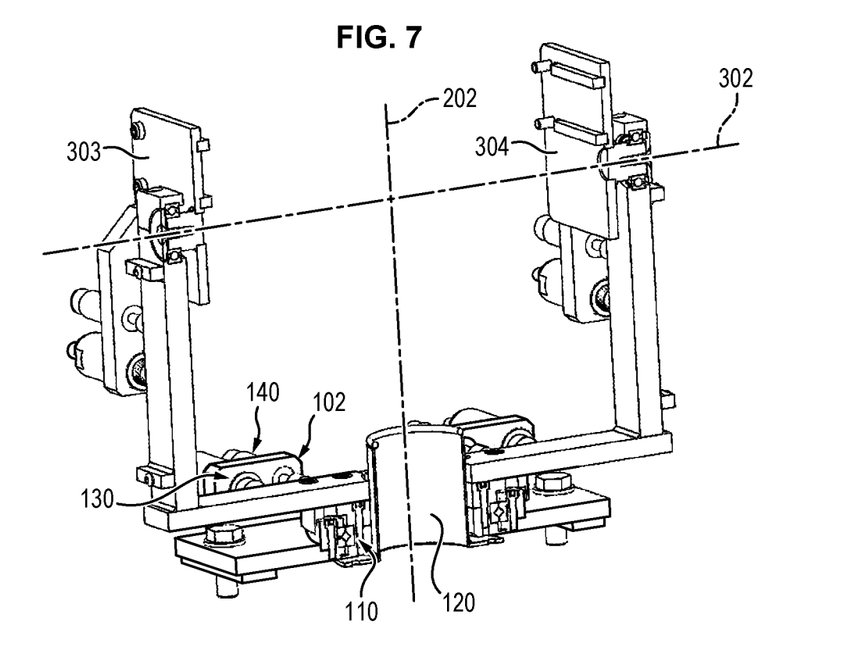
FIG. 7 represents a similar sectional view of the intermediate element hinged onto the base to give a better illustration of how to make a central axis in the form of a hollow cylinder through which the electrical connecting cables(s) can pass.

The base 210 is articulated in rotation on the base 100 by any appropriate means, for example by means of a cross-roller bearing 110 to leave a free central orifice 120, as illustrated on FIGS. 6 and 7, through which cables pass from the station to the case 300.

The allowable angular displacement between the intermediate element 200 and the base 100 about the vertical axis 202 is limited by a system of spring stops 130 and dampers 140. Thus, preferably two pairs of stops 130 and dampers 140 are provided, with one pair on each side of the base 210 and a stop 130 and a damper 140 on each side of the rotation axis 202, as illustrated on FIGS. 6 and 7.

The above-mentioned spring stop systems 130 are intermediate between the walls of the base 210 and the planes 102 facing these walls, supported by a horizontal part of the base 100. There can be many variant embodiments of the spring stop systems 130. They may be elements conforming with the arrangements illustrated on FIG. 8 comprising a spring 134 in a cage 132 that pushes an elastomer stud 136 or equivalent installed free to slide in the cage 132, in the outwards direction. Means in the form of shoulders 135 or equivalent limit the load on the stud 136 in the outwards direction relative to the cage 132 under the effect of the spring 134.

Figure 8:
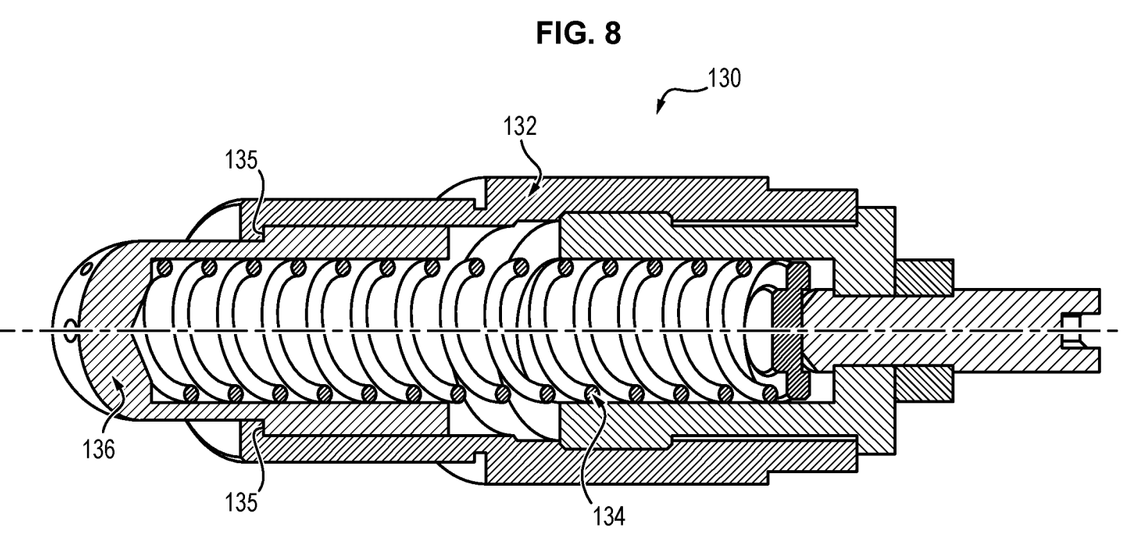
FIG. 8 represents a diagrammatic partial longitudinal sectional view of a rotation prevention device.

The shock absorbing means 140, for example of the hydraulic type, are associated with the system of stops 130 for compliance along the vertical axis 202 to prevent oscillations of the intermediate device 200 relative to the base 100.

The case 300 is itself free to rotate about the axis 302 on the flanges 212, 214 of the clevis 200. In this case too, the side plates 303, 304 connected to the side walls of the case 300 and articulated on the clevis 200 about the axis 302 are limited in angular movement about this axis 302 by stops 230 and shock absorbing means 240 similar to the above mentioned means 130 and 140.

As can be seen on FIG. 6, a pair of stops 230 and shock absorbers 240 is thus preferably provided on each side of each wing 212, 214 of the mobile element 200, fixed to the side plates 303 and 304.

The case 300 is elongated in shape along the direction of extension 322 of the arm 320.

Figure 3:
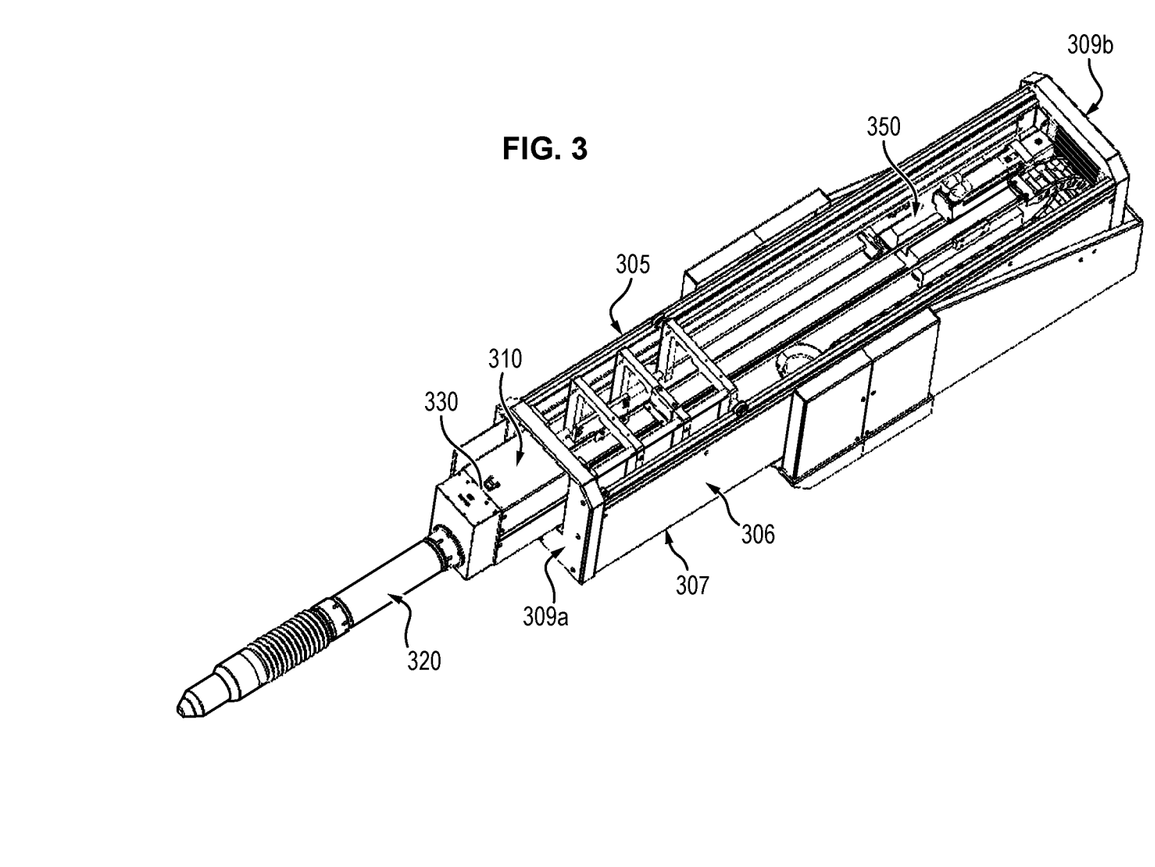
FIG. 3 represents a view similar to FIG. 1 with the arm in the extended position.
Figure 4:
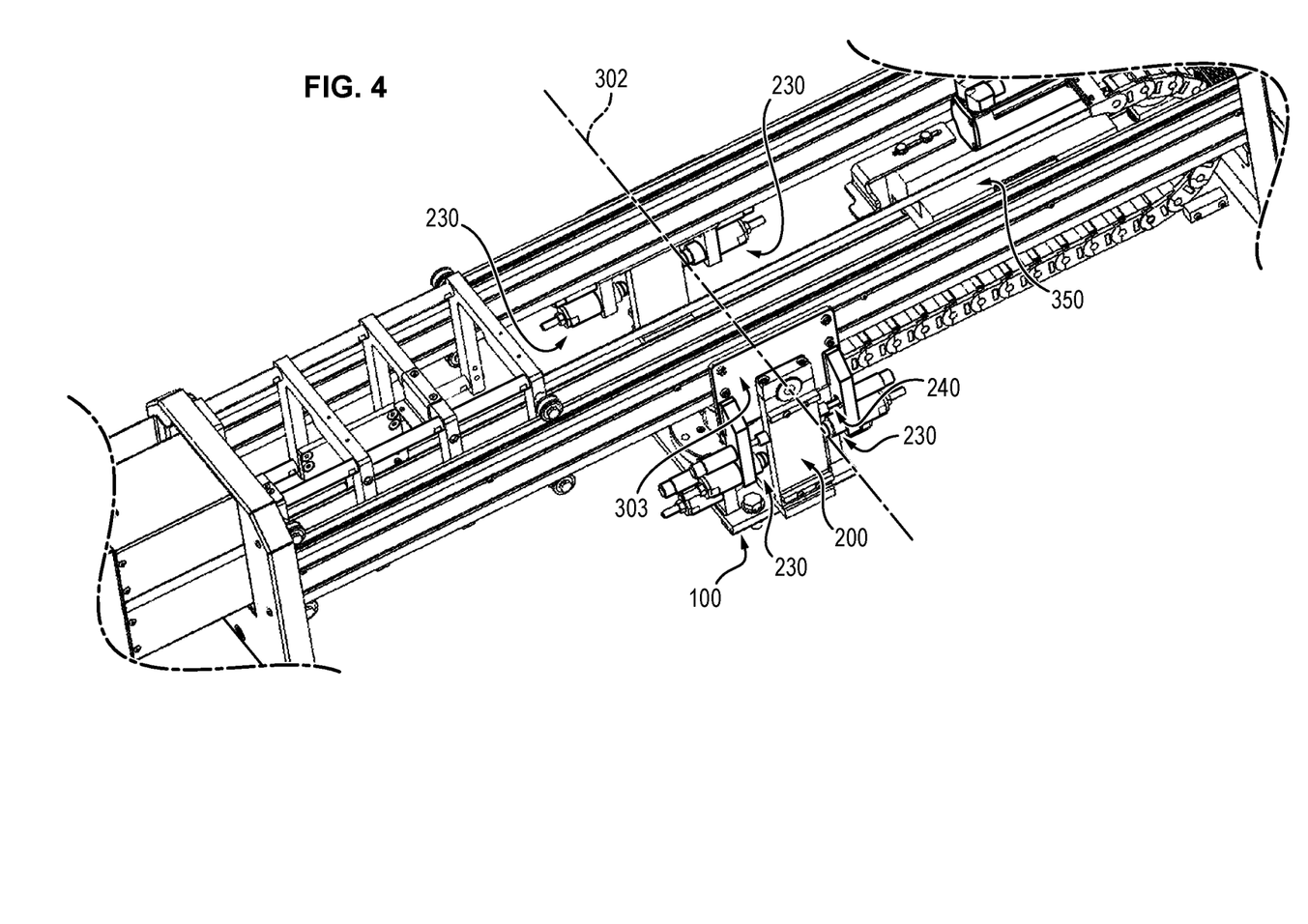
FIG. 4 represents a partial view of the device, more particularly illustrating the articulated installation of an intermediate element on a support base and the case of the coupling device on the intermediate element.
Figure 5:
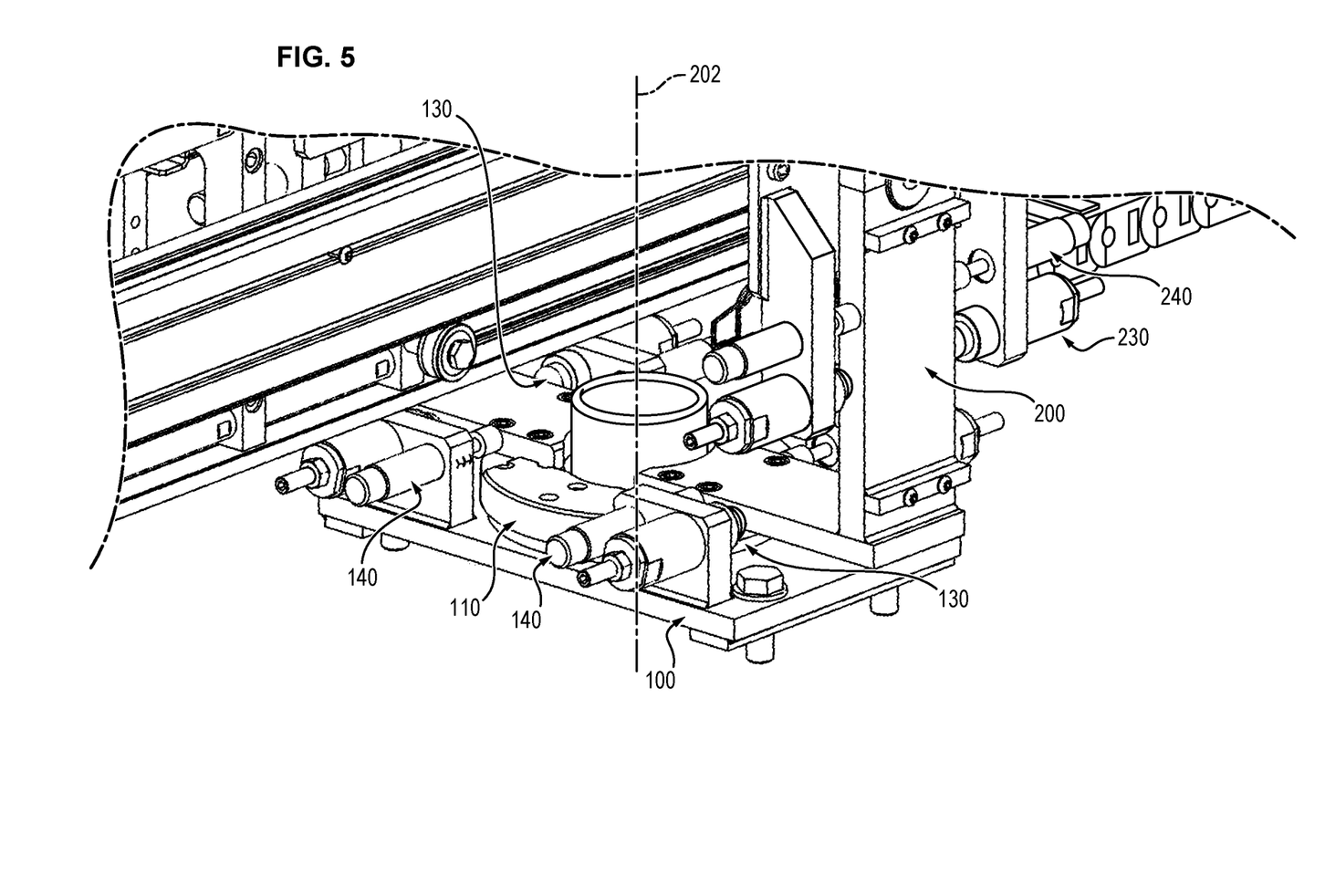
FIG. 5 represents another enlarged scale view showing the same articulation means of the case on the intermediate element and of the intermediate element on the base.

As illustrated more specifically in FIG. 3, in this case the case 300 comprises four longitudinal walls 305, 306, 307 and 308 (not shown on the figure for reasons of clarity) and two end walls 309a, 309b.

Figure 1:
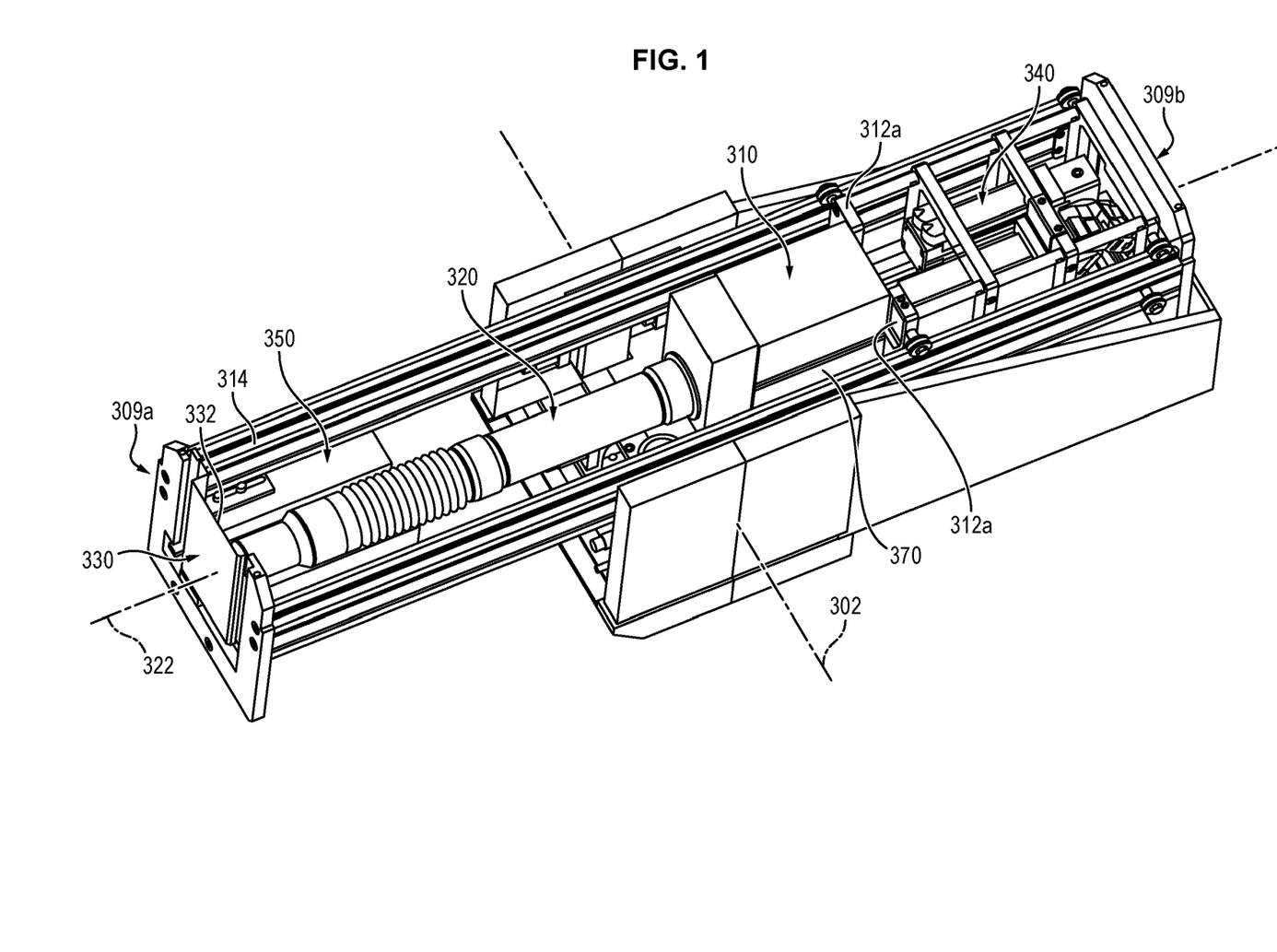
FIG. 1 represents a perspective diagrammatic view of an electric coupling device conforming with the invention when the extendable arm is in the retracted position, upper, lower and lateral elements of the case not being shown so as to illustrate the internal structure of the device.
Figure 2:
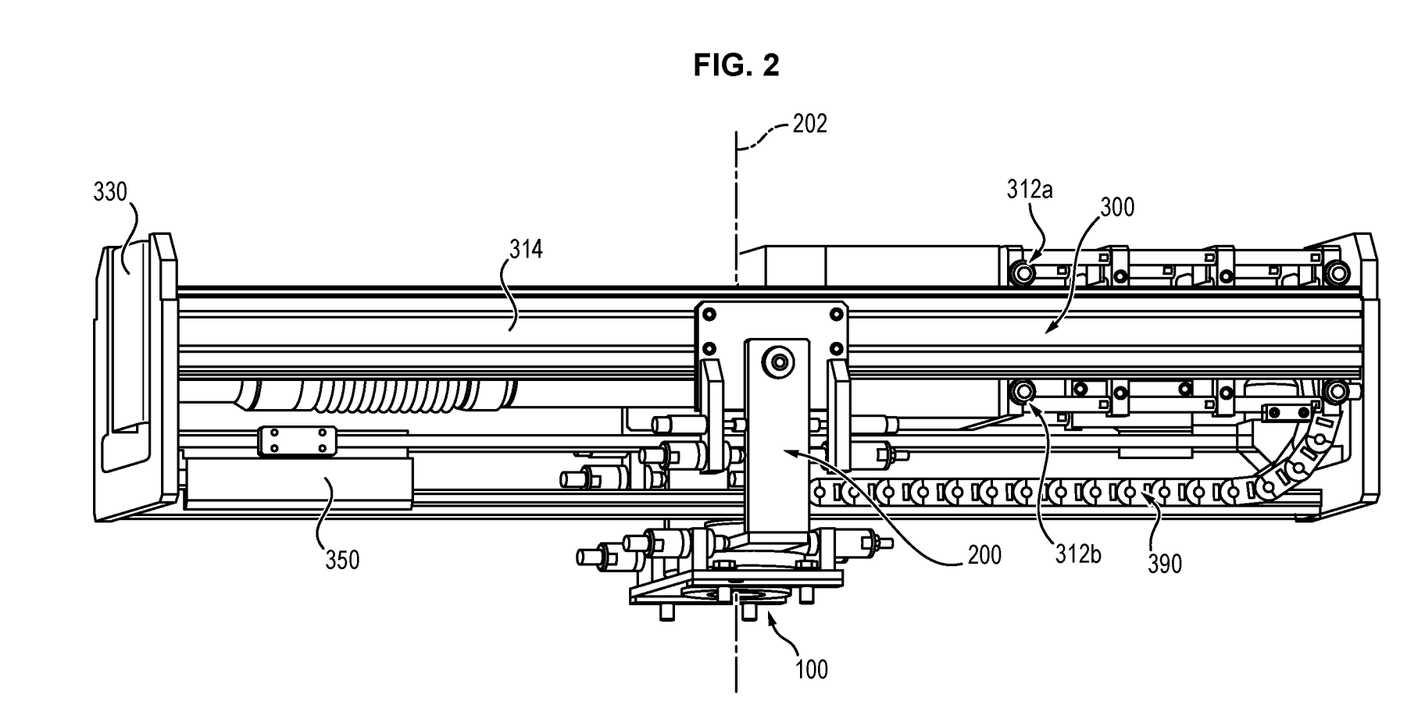
FIG. 2 represents another similar perspective view of the device according to this invention in the retracted position of the arm with an observation orientation different from that in FIG. 1, with other elements of the case not shown.

The front wall 309a through which the arm 320 will emerge, is fitted with a door or a trap 330, free to move between a closed position illustrated on FIGS. 1 and 2 and an open position illustrated in FIG. 3. This arrangement will be defined in more detail below.

The ram 310 is installed free to slide in the case 300 along the direction of extension 322. To achieve this, the ram 310 may for example by mounted on a carriage 370 guided free to slide along the direction of extension 322 by rollers 312 mounted on rails 314 extending in the longitudinal direction parallel to the direction of extension 322. As illustrated most particularly on FIG. 2, the upper rollers 312a and lower rollers 312b each roll on the rail 314.

The ram 310 is thus driven by a geared motor system 340 provided at the back of the case 300.

The case 300 also houses a continuous belt 360 wound on a first pulley 362 and a second pulley 364, formed close to the front wall 309a and the back wall 309b respectively of the case 300. The first and the second pulleys 362 and 364 are each installed free to rotate around an axis globally orthogonal to the direction of extension 322 of the ram 310 and the horizontal axis 302. In the example illustrated in FIG. 9, the first pulley 362 is a follower pulley while the second pulley 364 is the drive pulley and is driven in rotation by the geared motor system 340.

Figure 9:
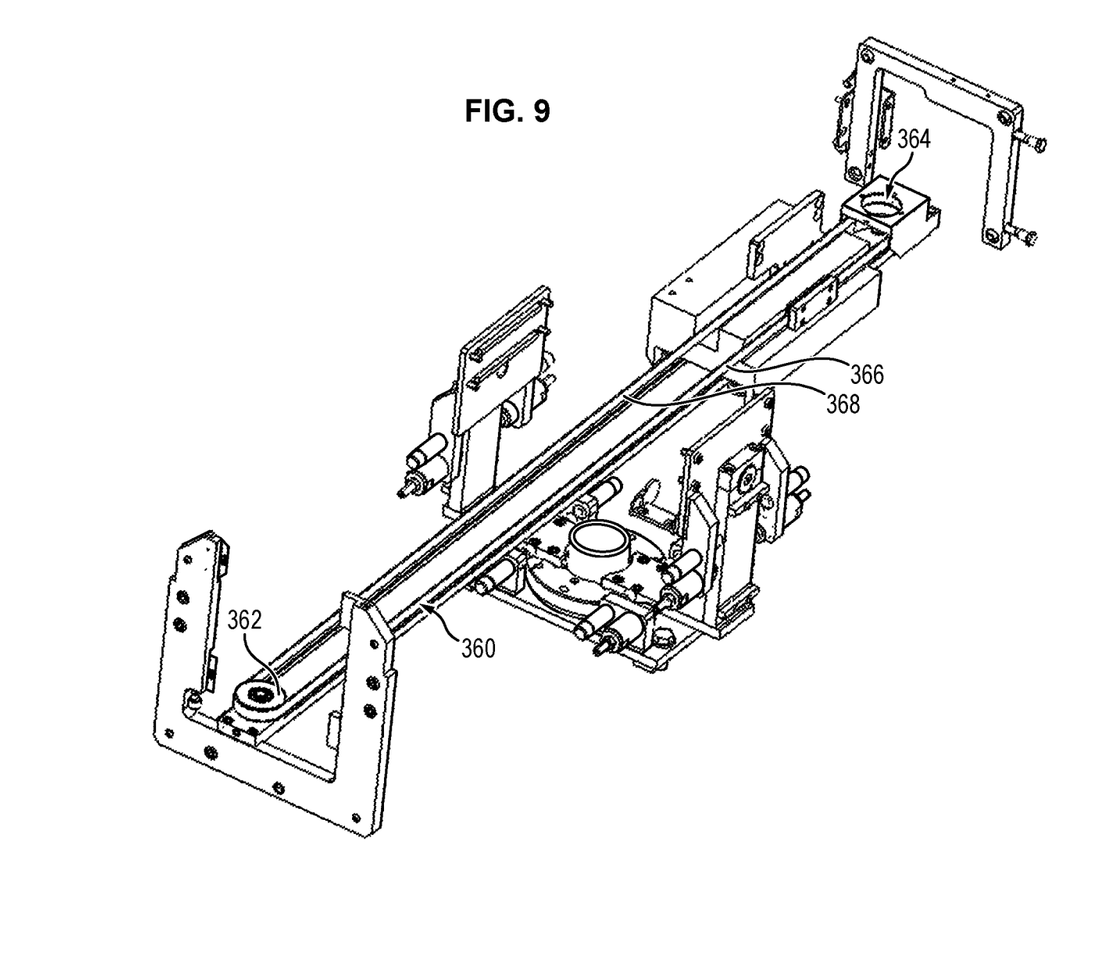
FIG. 9 shows a partial view of the coupling device particularly illustrating a belt/pulley system for extending the arm.

The ram 310 is fixed on a first strand 366 of the belt 360 and a counterweight 350 is provided on the second strand 368 of the belt 360, opposite the first strand 366. Thus, when the ram 310 is moved forwards into an extended position, the counterweight 350 is moved in the opposite direction, in other words towards the back of the case 300, such that the centre of gravity of the assembly composed of the ram 310 and the counterweight 350 always remains close to the intersection point of the articulation axes 202 and 302, so that the mechanical mass of the system is balanced regardless of the position of the ram 310.

A comparative examination of FIGS. 1 and 3 shows that in the retracted position of the arm 320, the counterweight 350 is located near the front of the case 300 close to the door 330 as illustrated on FIG. 1, while in the extended position of the arm 320, as illustrated on FIG. 3, the counterweight 350 is near the back of the case 300 close to the back wall 309b.

Figure 13:
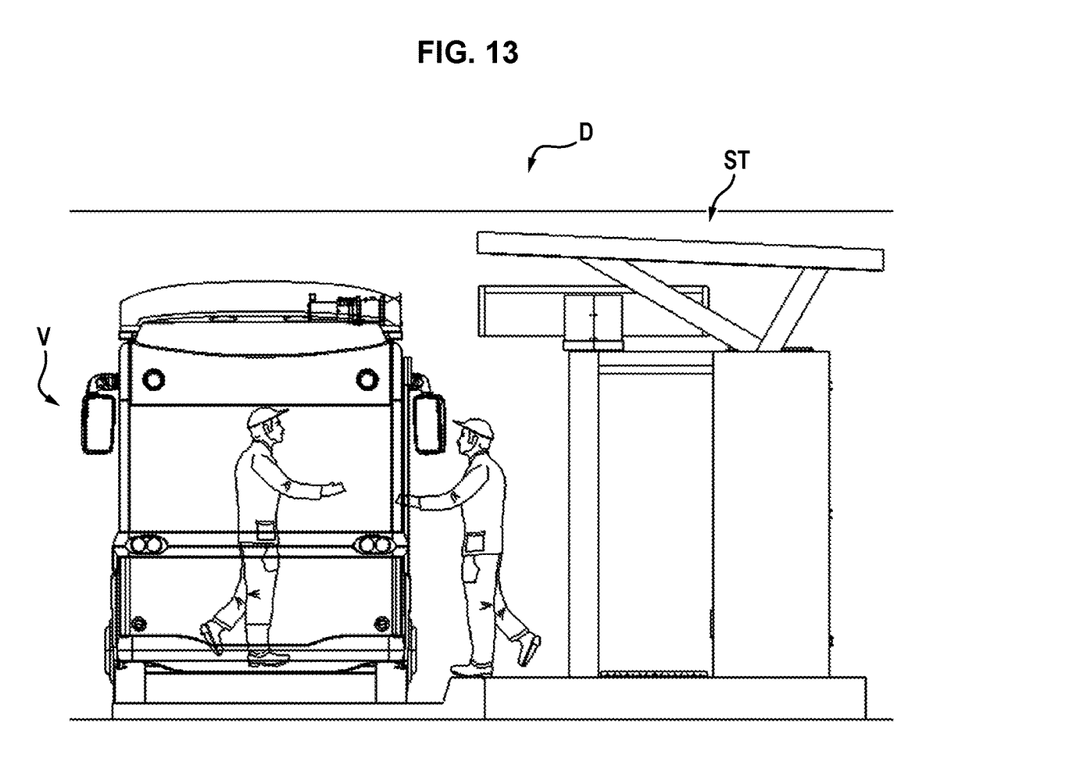
Figure 14:
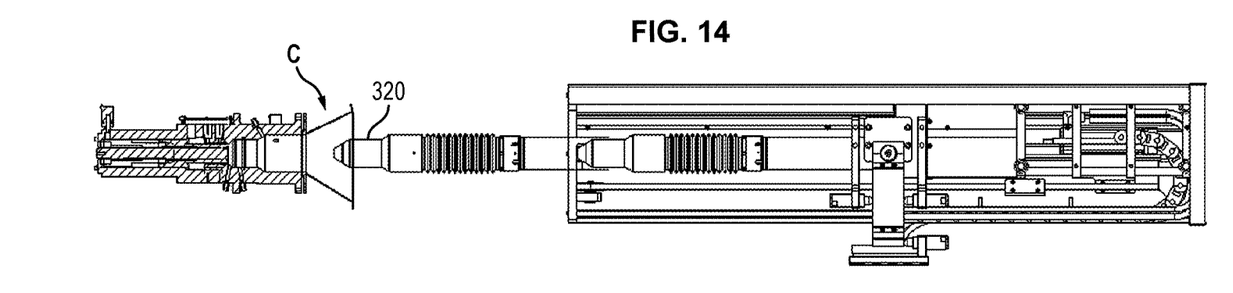

The principle of the invention is thus to disclose a tramway station ST in which the electric coupling device described above according to the invention is fitted near the top of the station, at D, as illustrated on FIG. 13. The associated vehicles V, for example tramway type vehicles, are equipped on their roof with a complementary part at the end of the arm 320, for example a female part in the form of a C-shaped cone adapted to hold the end of the arm 320. FIG. 14 thus illustrates an end of an arm 320 currently being extended in a position aligned coaxially at the entry into the cone C. With this alignment, the contact between the end of the arm 320 and the complementary means provided at the back of the cone C can be set up without difficulty.

Figure 15:
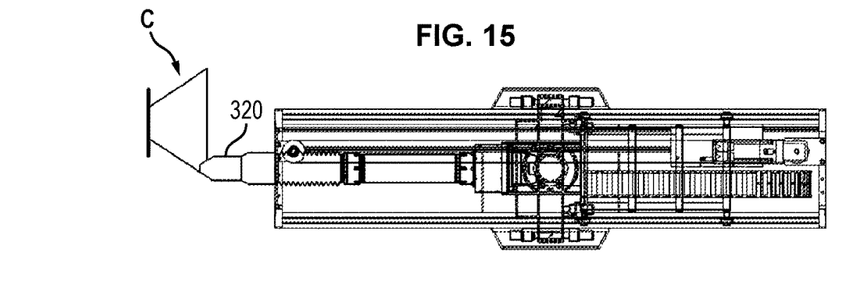
FIG. 15 represents a similar view in the case of an axial misalignment of the arm relative to the cone.

FIG. 15 illustrates the case of a misalignment between the end of the arm 320 and the cone C dependent on the position of the vehicle V relative to the station ST thus equipped.

Figure 16:
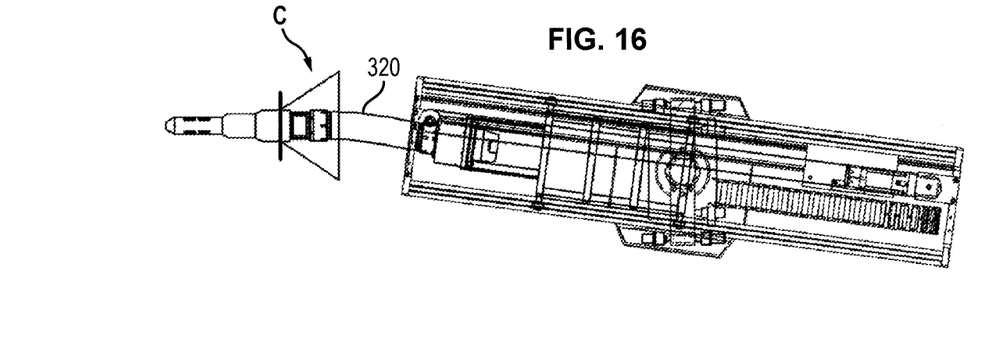
FIG. 16 represents the automatic alignment of the arm on the cone resulting from the degrees of freedom between the extendable arm and the support base, according to the invention.

As can be seen on FIG. 16, due to the double angular movement that the coupling device according to the invention makes possible about the vertical axis 202 and the horizontal axis 302, if necessary combined with the intrinsic flexibility of the arm 320, the end of the arm 320 can automatically realign itself on the bottom of the cone C, once the end of the arm 320 is facing the opening of the cone C. This intrinsic flexibility, in combination with the double angular movement is such that the arm only forms a single curvature, preventing an "S" type curvature (with 2 curvatures) that could generated dysfunction problems or premature deterioration.

As a non-limitative example of the invention, the system can be adapted to accept a tolerance of plus or minus 100 millimeters along X, in other words in the longitudinal displacement direction of the vehicle, and in Z, in other words in the vertical direction, and a tolerance of plus or minus 250 millimeters in Y, in other words in the direction of extension 322 of the arm 320 relative to the station.

Also as a non-limitative example, the total travel of the arm 320 along the extension direction 322 can be of the order of 1100 millimeters.

The door 330 provided on the front wall 309a of the casing 300 was mentioned earlier.

In the framework of the invention, the door 330 is preferably held elastically in the open position (rest position) and is held in the closed position mechanically by a pin provided on the counterweight 350 (elastically stressed position).

Thus, preferably, the door 330 is hinged on the case 300 about a vertical hinge with springs 332.

When the ram/coupler 310 is retracted, in other words when the arm 320 is retracted inside the case 300, a pin 352 provided on the counterweight 350 bears in contact with a roller or a cam 324 fixed to the door 330. The pin 352 thus forces the door 330 to close and stretches the springs 334 integrated into the hinge 332. Remember that in the rest position, the springs 334 mentioned above hold the door 330 in the open position. The above-mentioned system can thus link opening of the door 330 to the extension of the arm 320 of the ram 310 to prevent any operating problem, and particularly a leak or leak tightness problem.

Figure 10:
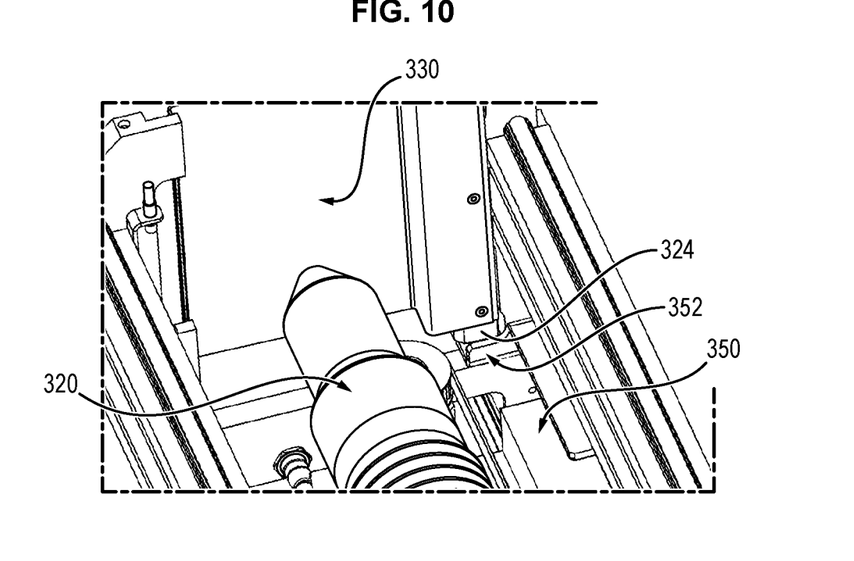
FIG. 10 represents a view of a door to close the case in the closed position.

FIG. 10 thus illustrates the door 330 in the closed position, the pin 352 of the counterweight 350 applying a force on the cam 324.

Figure 11:
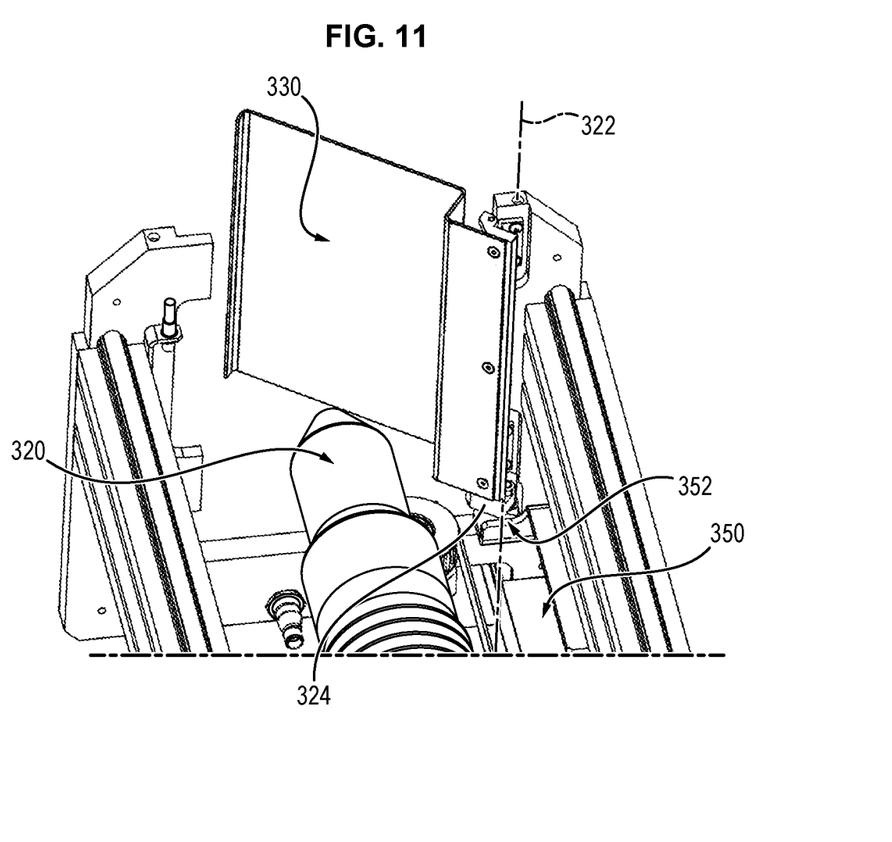

FIG. 11 illustrates the door 330 in the intermediate open position, the pin 352 of the counterweight 350 starting to move away from the cam 324, which releases the stress in the hinge springs 334 of the flap 330 and triggers opening of the flap 330 at the same time as the arm 320 is extended.

Figure 12:
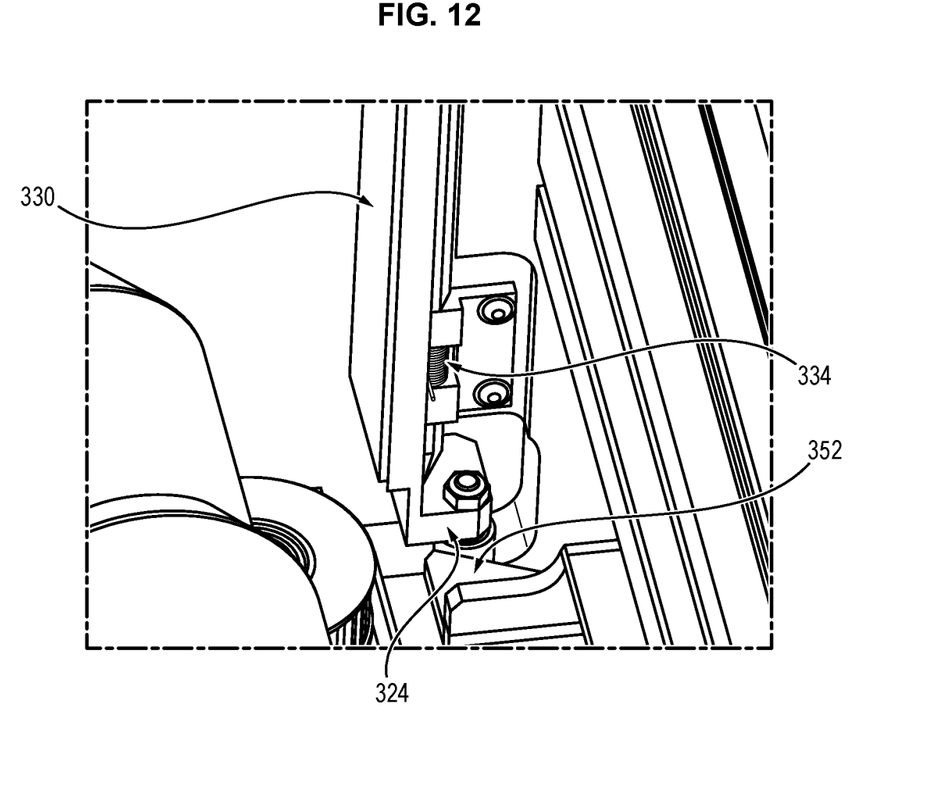

FIG. 12 illustrates the flap 330 in the fully open position. The springs 334 formed at the rotation axis 332 of the flap 330 are then in their unstressed position. FIG. 12 shows that the pin 352 of the counterweight 350 is no longer in contact with the cam 324 of the door 330.

An expert in the subject will realise that in particular, the invention provides the following advantages compared with the state of the art:
- a robust, reliable, inexpensive system that is easy to install on a station,
- a single ram is necessary for the connection, including closing of the door 330,
- the half-ball joint system, namely the two degrees of freedom authorised for the case 300 enclosing the arm 320 of the ram 310, avoids stressing the connectors used to make the electrical connection between the charging station and the vehicle,
- the system according to the invention avoids the need for excessive pushing forces and avoids a large movement curve of the connection.

Obviously, this invention is not limited to the particular embodiments that have just been described.

FIG. 2 diagrammatically shows reference 390 representing an articulated connection means passing along the path from the opening 120 formed in the base 100 and connected to the arm 320, to make an appropriate electrical connection regardless of the combined angular position of the case 300 and extension of the arm 320.

The invention claimed is:

1. Electric coupling device for an electric vehicle charging station comprising a ram/coupler (310) fitted with an extendable arm (320) suitable for being moved between a retracted position and an extended position in which the arm (320) is adapted to provide an electric link with a complementary electric part provided on an electric vehicle, such as a C-shaped cone, and support means (100, 200) for supporting the ram/coupler (310) allowing two degrees of rotational freedom of the ram/coupler (310) relative to a support base (100), about two axes (202, 302) transverse to each other and orthogonal to a direction (322) of extension of the arm, the ram/coupler (310) being capable of angular displacement about a vertical axis (202) and about a horizontal axis (302) perpendicular to the direction (322) of extension of the arm (320) relative to the support base (100), and the extendable arm (320) is mounted on a means connected to a strand (366) of a belt (360) driven by a geared motor (340), the device being characterised in that the rarer/coupler (310) is placed in a protective housing (300), the device comprises the support base (100) adapted to be fixed to a support point and an intermediate element (200) installed free to make angular movements about said vertical axis (202) on the support base (100), the protection case (300) of the ram/coupler (310) being installed free to make angular movements about said horizontal axis (302) on the intermediate element (200), the device further comprising stops (130, 230) limiting the angular movement of the intermediate element (200) in regard of the support base (100) about said vertical axis (202) and limiting the angular movement of the protection case (300) in regard of the intermediate element (200) about the horizontal axis (302) a counterweight (350) being connected to a strand (368) of the belt (360) opposite to the strand on which is mounted the extendable arm (320) so that when the arm (320) is moved into the extended position, the counterweight is moved into the opposite direction and the centre of gravity of the device always remain close to the intersection point of said vertical axis (202) and said horizontal axis (302) so that the mechanical mass of the system is balanced regardless of the position of the arm (320), the arm (320) being at least partly flexible so that the double angular movement possible about the vertical axis (202) and the horizontal axis (302) combined with the intrinsic flexibility of the arm (320) allows automatic alignment of the end of the arm (320) with said complementary electric part provided on the electric vehicle when the end of the arm (320) is facing the complementary part provided on the electric vehicle with a single curvature, preventing an "S" type curvature and in that the protective housing (300) is provided with a door (330) free to move in displacement between a closed position in the retracted position of the extendable arm (320), and an open position in the extended position of the arm (320).

2. Device according to claim 1, wherein the door (330) is held elastically in the closed position by a pin (352) fitted on the counterweight (350) and loaded elastically in the open position to return to its rest position.

3. Device according to claim 1, wherein said device comprises damping means (140, 240) constraining the angular movement of the support means (100, 200) of the ram/coupler (310).

4. Device according to claim 1, wherein the ram/coupler (310) is mounted on a carriage (370) guided in translation on rails (314).

5. Electric vehicle charging station, wherein the electric vehicle charging station is equipped with an electric coupling device according to claims 1.

6. Device according to claim 1, wherein the total travel of the arm (320) between the retracted position and an extended position is of the order of 1100 millimeters.

7. Device according to claim 1, wherein said stops (130, 230) are adapted to accept a displacement of the end of the arm (320) of plus or minus 100 millimeters along the vertical axis (202) and the horizontal axis (302).

* * * * *